Figure 3:
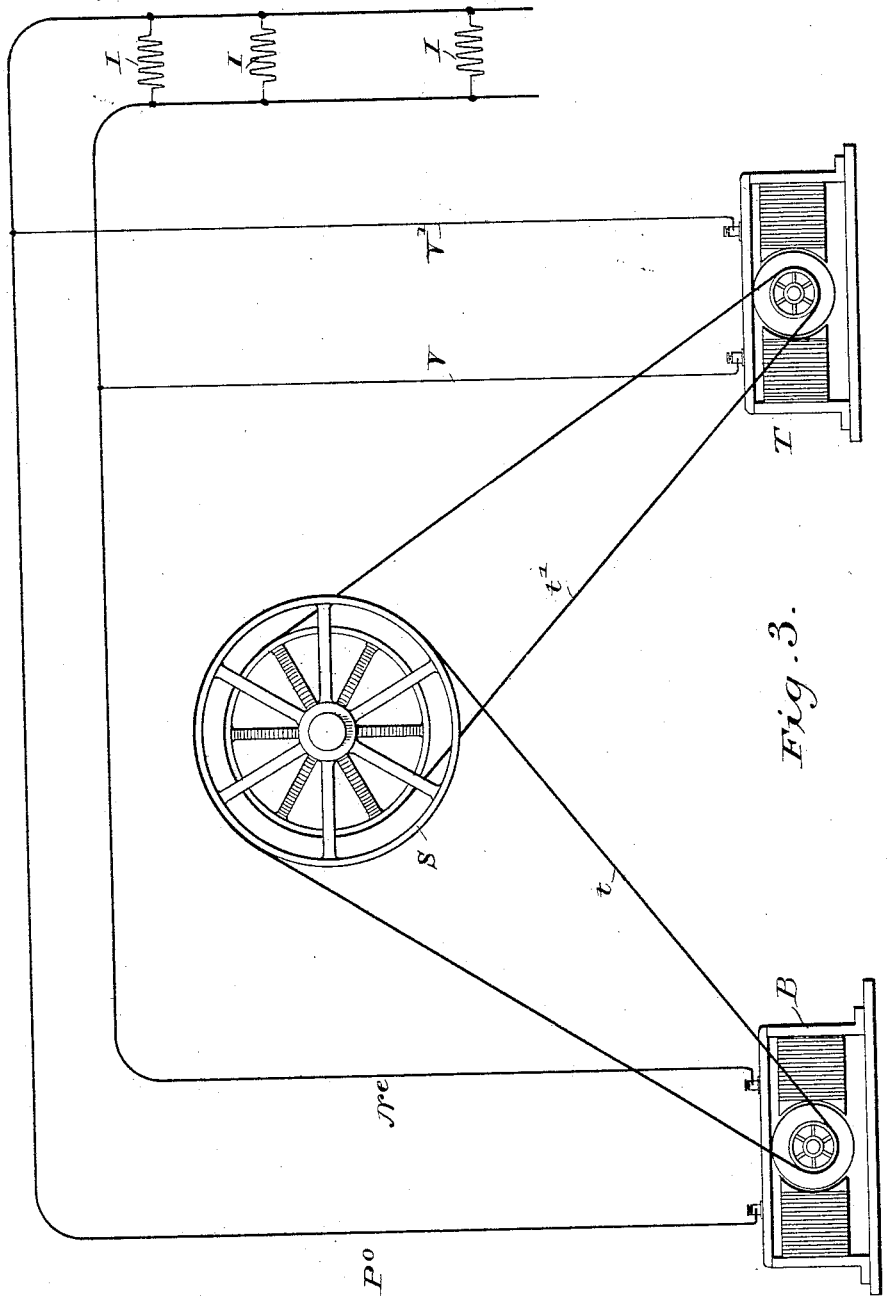

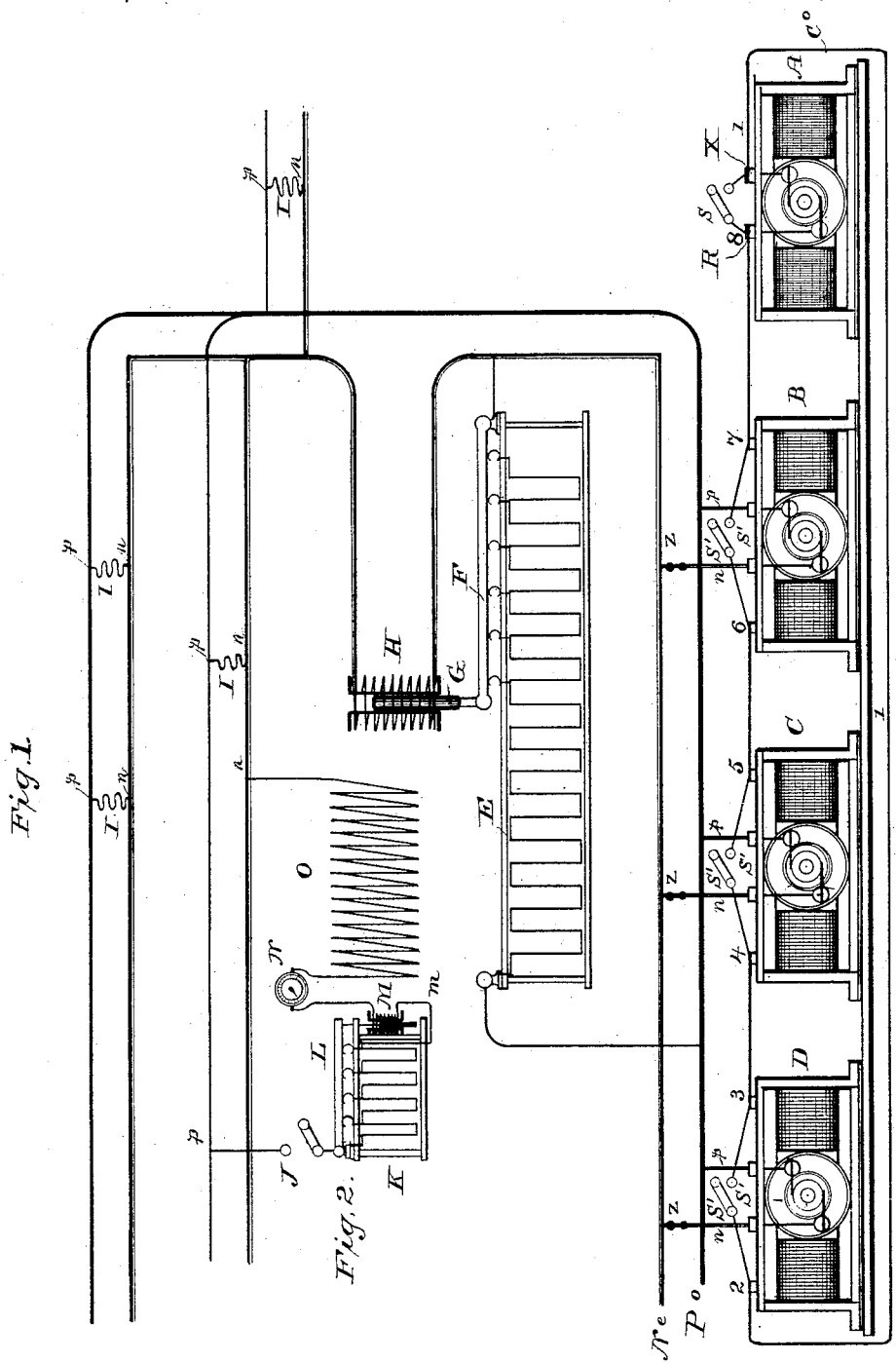

UNITED STATES PATENT OFFICE.

CHARLES J. VAN DEPOELE, OF CHICAGO, ILLINOIS.

SYSTEM OF GENERATING ELECTRICAL CURRENTS.

SPECIFICATION forming part of Letters Patent No. 338,321, dated March 23, 1886.

Application filed November 12, 1885. Serial No. 182,622. (No model.)

*To all whom it may concern:*

Be it known that I, CHARLES J. VAN DE-POELE, a citizen of the United States, residing at Chicago, in the county of Cook and State of Illinois, have invented certain new and useful Improvements in a System of Generating Electric Currents, of which the following is a specification, reference being had therein to the accompanying drawings.

My invention relates to new and useful improvements in the generation, distribution, and regulation of electric currents, especially adapted to furnish such currents of constant electro-motive force for the running of electric motors on railway-cars, and other purposes.

The following is a description of my system, reference being had to the accompanying drawings, forming part of this specification, in which—

Figure 1 is a diagrammatic view illustrating my system. Fig. 2 is a plan of the circuits of one of the motors; and Fig. 3 represents a motor of comparatively high internal resistance, which is normally in circuit, and arranged to be automatically set in operation under conditions to be described.

Similar letters denote like parts throughout.

In Fig. 1 are shown four electric generators, A, B, C, and D. A is used as an exciting-machine, intended to energize the field-magnets of the generators B, C, and D or as many more as may be desired. The generator A is preferably a shunt-machine, and so wound and connected as to give a constant current under the different changes of resistances within its range or capacity—that is to say, that if ten main generators are to be energized by one exciter, that the latter shall be able to furnish a constant current in the field-magnets of the dynamos or generators, whether one or all are in circuit. As shown in the exciting-circuit, coming from the exciter to the other field-magnets, switches S and S' are placed so that each machine can be cut out of circuit and its production of current stopped in case that the brushes have to be trimmed or its current is not wanted. Another switch, Z, is provided each main conductor, going from the armature of the generator to the main or outside circuit, thus enabling me to cut each particular machine out of the main circuit independent of the others.

The exciting-circuit is as follows: R represents the positive and X the negative pole. The current starts from X at 1, by suitable conductors, C°, to 2 in machine D, out at 3, to machine C at 4, out of same at 5, to machine B at 6, and out at 7, &c., thence to exciter A at 8 or terminal R, thus closing the exciting-circuit. If, now, on any particular machine the switches S and S' are brought in contact, the current which was first passing through the field-magnet coils will now be diverted from the same by the shorter wires connecting the field binding-posts to the switches, thus stopping the generation of current in this machine. The armatures of the main generators are not in circuit with their field-magnet, and, as here shown, any number of said armatures can be coupled up in multiple arc, and connected to the service-conductors P° and N°, from which current is to be taken to run the motors. As shown, the positive conductor of each armature is connected to the main conductor, (the positive,) while the negative conductor of each machine is connected to the other main conductor, (the negative.) The field-magnets of all the main machines being all of the same size, and the current flowing through all, being also of uniform strength, will produce a field of force in each machine equal to that of the other, so that all the armatures will revolve in an equal magnetic field, and the armatures being all driven at the same speed, and the resistance of their conductor or coils wound around the same being in each case alike, it will naturally follow that the electro-motive force of one armature will be equal to that of the other, provided the same lead is given to all the brushes. It will be seen that any number of machines may thus be run together, keeping at all times a constant electro-motive force, whether one or all the machines are working. However, the intensity of current the machines are capable of producing will depend upon the number of machines thus placed in multiple arc— as, for instance, one machine will produce a current of one thousand volts and twenty ampères, ten machines will produce a current of one thousand volts and two hundred ampères—so that, as before stated, the addition of machines to the main conductors will not increase the electro-motive force, but will increase the intensity accordingly.

In electric railroading I find it most practical to use currents of from five hundred to one thousand volts potential, or even more, according to the distance over which the motors are to be worked, bringing the size and weight of the main or service conductors to a minimum for a given amount of work; but in order to keep safe the machines producing this electro-motive force, I find it necessary to place an artificial and variable resistance between the poles of the main conductors $P^o$ and $N^o$, the use of which I will now explain. As stated, the armatures are all energized by a current flowing around their field-magnets, not in common with the armatures, but furnished by a separate exciting-machine, so that on running all machines to their normal speed, a potential, say, of one thousand volts, will be produced between their respective positive and negative brushes of their armatures. However, if no motors or other resistances are placed in communication with the two main conductors, the current will leap or jump from one brush to the other, and all the machines would be short-circuited, burn up their brushes, &c. So, in order to avoid all this I simply put a temporary resistance between the two main conductors, through which a portion of the main current flows, just sufficient to prevent the machines flashing around their commutators. This resistance, however, is arranged as shown in the drawings, (indicated by letter E,) so that as soon as sufficient current is taken by the motors from the main line to prevent flashing, the solenoid H will draw in the core G and gradually lift the contact-bar F from the resistance-coils, thus cutting more or less of said resistance in circuit, and in so doing diminish the current through the said resistance-coils until sufficient current is flowing in the main line, when the artificial resistance will be entirely out of circuit, and no current will then be passed therethrough.

It will be understood that if there were always one or more motors working and taking current from the main line the resistance would not be wanted; but it happens frequently that all the motors are thrown out of circuit at the same time, which would cause the current, as already stated, to leap around the commutators and destroy their parts. So, it is here that the artificial resistance, at the moment that no current is taken out, or at least very little, comes into play and saves the machines harmless.

As shown in the drawings, the main current passes through the solenoid H and actuates the contact-bar F by means of the core G; hence as soon as a certain amount of current is passing through solenoid H, which will depend upon the number of motors in circuit, the resistance will correspondingly be increased or diminished, or entirely cut out of circuit, as the case may be. In cases where the potential is only one hundred volts, or even two hundred, this arrangement would become useless; but since I prefer to use higher tension than this, I have adopted the above system, which gives good and practical results.

Although it is not absolutely necessary to cut the resistance out automatically, I prefer to do so, on account of economy in current. The action of a fixed resistance is here given. We admit that the generators are running normally and with a potential of one thousand volts, and that the maximum intensity required to do all the work on the line is two hundred ampères. As long, however, as no motors are placed in circuit, we will be compelled to keep a certain amount of current—say five ampères—flowing through the artificial resistance. To prevent flashing, however, the moment one or more motors are placed in circuit the current in the artificial resistance will be correspondingly diminished, since all the motors work in multiple arc with each other, and that the larger the number of motors there are working between the main conductors the less will be the total resistance between the latter conductors, and since the resistance in the rheostat is higher and constant, it receives less current when more work is done, and more current when less work is done, thus partly compensating the condition of the line, which, in practice, is constantly changing, so that if we do not care about the comparatively small loss of current through the rheostat, we can dispense with the automatic arrangement. Another arrangement can be had, doing away with the rheostat, by placing an electric motor belted or otherwise connected to the main driving-power running the generators, and instead of sending the current through the rheostat, to send it through said motor, which will also prevent all flashing of the main generators and turn to advantage the power or current otherwise lost. The current in the motor would change as it does in the rheostat.

The arrangement above referred to is shown in Fig. 3, in which B is the generator, driven by a suitable belt, $t$, from the pulley S, which is in connection with the source of power. T is the addtional motor used in place of the rheostat, and it is connected to the source of power by belt $t'$ or otherwise, and to the main circuit by conductors V V', and when said motor is energized by the current that is forced through it when most or all of the other work on the line is cut out, its action will be to assist the prime power, suitable mechanical connections being provided. The motor T is preferably of higher internal resistance than the service-motors, so that it will only take any considerable quantity of current when there is little or no other work to be done; but, if found desirable, a motor of the standard resistance may be used, which should then be so arranged that it may at times be entirely cut out of circuit by the magnet H, as heretofore explained in connection with the rheostat.

From the above description it will be seen that I am enabled to keep up a high potential at the terminals of the generators without compromising the parts thereof, and that this is done by means of a rheostat or artificial resistance placed between the two main or service conductors, so that in case of all the motors being out of circuit, the current will be prevented from flashing or leaping between the brushes of the main armatures, and that more current will be passed through said rheostat, when less current is taken from the main line, and vice versa.

As shown in the drawings, all the motors or other devices are placed in multiple arc between the two main conductors, as indicated by I I, &c. Fig. 2 shows the circuits in each motor placed between the two mains or their branches. Each motor is provided with an artificial resistance, which at the moment of starting is automatically placed in circuit, so as to prevent more current from flowing through the motor than its due portion, and thus to prevent the dropping of the electro-motive force and the current on the main line by casual short-circuiting in the event of starting a large number of motors at one time. The resistance here placed in circuit is about equal to the counter electro-motive force of the motor when running. This resistance need not be a separate part from the motor, but a high resistance of fine copper wire can be placed upon the very coils of the motor, thus increasing its power at the moment of starting, and can be cut out of circuit the moment sufficient speed is attained by the motor.

The above, however, will be more fully explained and claimed in a separate application.

Although I have here shown a number of dynamo-electric machines having all their fields separately excited, I intend equally well to use the rheostat in the case of shunt-wound dynamos whenever their potential is high enough, and there is danger from leaping, as above explained.

What I claim as new, and desire to secure by Letters Patent, is—

1. In a system of generating and distributing electric currents of constant electro-motive force and varying intensity, the combination, with generators the field-magnets of which are energized from an independent source of electricity, of means for preventing leaping of the current between the commutator-brushes, consisting of an artificial resistance temporarily placed in the working-circuit whenever the motors or other translating devices are using less than a predetermined amount of current, as set forth.

2. In a system of generating and distributing electric currents, the combination, with a number of dynamo-electric generators, all connected in multiple arc, of an independent source of electricity for energizing the field-magnets and producing in all the machines an equal potential, and means for automatically introducing and withdrawing artificial resistance between the main conductors as the working-resistance is increased or decreased beyond a predetermined point, as set forth.

3. In a system of generating and distributing electric currents of varying intensity and constant electro-motive force, the combination, with a plurality of generators the field-magnets of which are energized from an independent source of electricity, and all their armatures connected to the main conductors in multiple arc, of an artificial or temporary resistance also in multiple arc, and normally absorbing a sufficient amount of current to prevent injury to the generators by the current leaping between the commutator-brushes, and means, substantially as described, for increasing or entirely cutting out said resistance as working-resistances are added to the main line in parallel circuit therewith, as set forth.

4. In a system of generating current for the transmission of electric energy, a number of electric generators excited from a separate source of electricity and connected in multiple arc to the main conductors, an electric motor normally in the main circuit, but of higher resistance than the other working-resistances, and mechanical connections between said motor and the source of power, whereby the current forced through said motor by the cutting out of said circuit of other work is caused to return power to the prime motor, as set forth.

In testimony whereof I affix my signature, in presence of two witnesses, this 7th day of November, 1885.

CHARLES J. VAN DEPOELE.

Witnesses:
WM. A. STILES,
JOHN EASON.